United States Patent [19]

Ham

[11] 4,409,349
[45] Oct. 11, 1983

[54] STABILIZED POLYCARBONATE COMPOSITIONS

[75] Inventor: George E. Ham, Lake Jackson, Tex.

[73] Assignee: The Dow Chemical Company, Midland, Mich.

[21] Appl. No.: 370,698

[22] Filed: Apr. 22, 1982

[51] Int. Cl.³ .............................................. C08K 5/15
[52] U.S. Cl. .................................. 524/108; 528/196; 528/204
[58] Field of Search ........................................ 524/108

[56] References Cited

U.S. PATENT DOCUMENTS 3,287,316 11/1966 Falkai et al. ........................ 524/108
3,578,623 5/1971 Weissermel et al. ............... 524/108

*Primary Examiner*—John Kight, III
*Assistant Examiner*—R. A. White
*Attorney, Agent, or Firm*—B. C. Colley

[57] ABSTRACT

Polycarbonates are heat stabilized by the incorporation of a dioxolane compound having a boiling point greater than about 250° C. The amount of dioxolane compound used is from 100 to 10,000 parts per million.

6 Claims, No Drawings

STABILIZED POLYCARBONATE COMPOSITIONS

BACKGROUND OF THE INVENTION

This invention relates to heat stabilized aromatic polycarbonate compositions which are resistant to yellowing during heating due to the incorporation of 2-keto-1,3-dioxolane compounds.

It is known from U.S. Pat. No. 3,888,817 dated June 10, 1975 that polyester resins can be stabilized against the loss of molecular weight by adding a cyclic carbonate (2-keto-1,3-dioxolane) and an antioxidant such as a phenol, phosphite or an amine. However, the reference does not suggest the application of these cyclic carbonates to polycarbonate resin nor does it indicate any reduction in the yellowing of the resins.

It is also known from U.S. Pat. Nos. 4,066,611 and 4,076,686 that polycarbonates can be heat stabilized with additives which include epoxy compounds.

SUMMARY OF THE INVENTION

It now has been found that aromatic polycarbonates can be heat stabilized and made resistant to yellowing by blending the polycarbonates with a 2-keto-1,3-dioxolane compound having a boiling point greater than about 250° C.

The amount of the dioxolane compound used herein can range from 100 to 10,000 parts per million with the preferred amount being 500 to 5,000 parts per million.

DETAILED DESCRIPTION OF THE INVENTION

The aromatic polycarbonates that are useful in this invention are made from dihydroxy compounds having the following general formula:

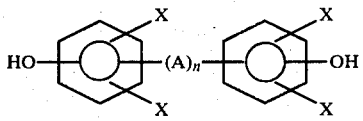

wherein A is a divalent hydrocarbon radical containing 1–15 carbon atoms,

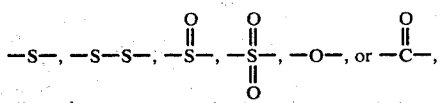

X is independently hydrogen, chlorine, bromine, fluorine, or a monovalent hydrocarbon radical such as an alkyl group of 1–4 carbons, an aryl group of 6–8 carbons such as phenyl, tolyl, xylyl, an oxyalkyl group of 1–4 carbons or an oxyaryl group of 6–8 carbons and n is 0 or 1.

One group of suitable dihydric aromatic compounds are those illustrated below:

1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)hexane
2,2-bis(3,5-difluoro-4-hydroxyphenyl)butane
2,2-bis(4-hydroxyphenyl)propane(Bis A)
1,1-bis(3-methyl-4-hydroxyphenyl)ethane
1,1-bis(4-hydroxyphenyl)methane.

Another group of dihydric aromatic compounds useful in the practice of the present invention include the dihydroxyl diphenyl sulfoxides such as for example:

bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric aromatic compounds which may be used in the practice of the invention includes the dihydroxyaryl sulfones such as, for example:

bis(3,5-diisopropyl-4-hydroxyphenyl)sulfone
bis(3,5-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric aromatic compounds useful in the practice of the invention includes the dihydrocydiphenyls:

3,3',5,5'-tetrabromo-4-4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric aromatic compounds which may be used in the practice of the invention includes the dihydric phenol ethers:

bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether Other dihydric aromatic compounds of interest include the phthalein type bisphenols which are disclosed in U.S. Pat. Nos. 3,035,021; 3,036,036; 3,036,037; 3,036,038; and 3,036,039.

It is, of course, possible to employ a mixture of two or more different dihydric aromatic compounds in preparing the thermoplastic carbonate polymers of the invention.

Examples of known 2-keto-1,3-dioxolane compounds which are useful in this invention are

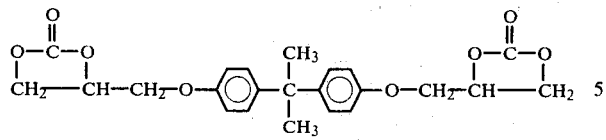

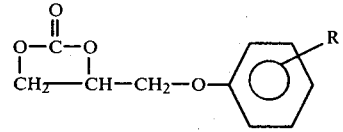

R is H or an alkyl group of 1-4 carbons.

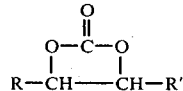

R is aryl or alkyl groups
R' is the same or different aryl or alkyl groups.

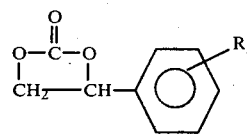

R is H or an alkyl group of 1-4 carbons.

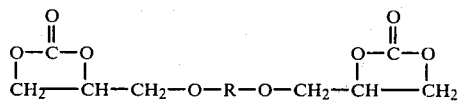

R is phenylene,—$(CH_2)_n$—, where n is 1 to 10.

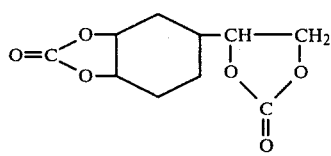

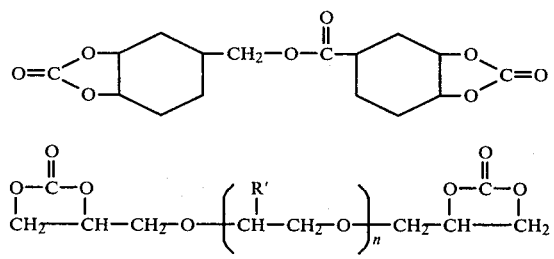

where
n is 0 to 10
R is H or $CH_3$.

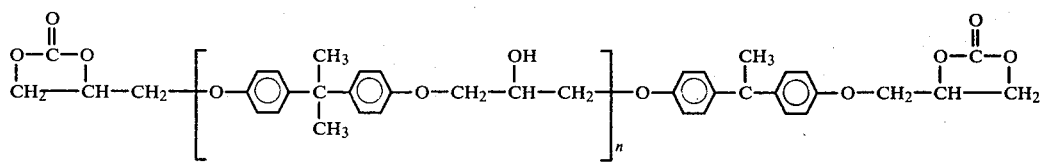

where n is 1 to 10.

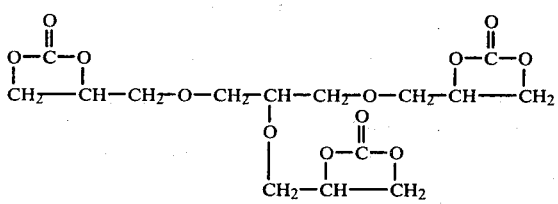

EXAMPLE 1

1 gram of 2,2-bis[p-(2-keto-1,3-dioxolanyl-4-methoxy) phenyl] propane (BDP) was dissolved in 100 ml of heptane and mixed with 500 grams of a powdered bisphenol A polycarbonate having a weight average molecular weight of about 30,000.

The treated powder was dried in a vacuum oven at 125° C. for 16 hours. The dried powder was extruded and chopped in a conventional twin screw extruder having a barrel temperature of 316° C. (600° F.) and a die temperature of 196° C. (385° F.).

A sample of the pellets from the extruder was molded into optical disks 2 inches (5.08 cm) in diameter by $\frac{1}{8}$ inch (0.317 cm) thick at 301.6° C. (575° F.). A control sample without the additive was given the identical treatment. The discs were measured for light transmittance and yellowness index. The results are given in Table I.

TABLE I

| Sample | % Light Transmittance | ASTM D-1925 Yellowness Index |
|---|---|---|
| Control I (no additive) | 88.5 | 5.0 |
| Ex. 1 (BDP) 2,000 ppm | 89.2 | 4.2 |

EXAMPLES 2 AND 3

Following the procedures of Example 1, 908 grams of the same polycarbonate was treated with 1.816 grams of the additives of Table II and pelletized. Samples of pellets were molded after one extrusion and after three extrusions. The results are set forth in Table II.

TABLE II

| | ASTM D-1925 Yellowness Index of Test Discs | |
|---|---|---|
| Sample | After 1 Extrusion | After 3 Extrusions |
| Ex. 2 BDP 2,000 ppm | 4.0 | 6.2 |
| Ex. 3 4-p-toluyloxy methyl-2-keto-1,3-dioxolane 2,000 ppm | 4.3 | 8.4 |
| Control 1 (no additive) | 5.2 | 9.0 |

EXAMPLE 4

A powdered commercial polycarbonate resin containing no additives (NOVAREX) in the amount of 3,300 grams was mixed with 132 ml of a heptane solution containing 2.5 weight percent of 2,2-bis[p-(2-keto-1,3-dioxolanyl-4-methoxy) phenyl] propane to give a polycarbonate resin containing 1,000 parts per million of the additive. The resin mixture was vacuum dried at 120° C. for 6 hours. The resin was then extruded eight times at 600° F. (316° C.) at 30 rpm through a one-inch (2.54 cm) extruder. After each extrusion, 300 gram samples were injection molded into test disks at 575° F. (301.5° C.) and 12,000 psi. (82.68 MPa)

The resin without stabilizer had a yellowness index of 2.9 before extrusion. The resin with stabilizer had an yellowness index of 2.8 before extrusion. The results after eight extrusions for both are given in Table III.

TABLE III

| Sample | % Light Transmittance | ASTM D-1925 Yellowness Index |
|---|---|---|
| Control | 72.7 | 31.25 |
| Example 4 | 77.05 | 20.75 |

We claim:

1. A heat stabilized aromatic polycarbonate composition resistant to yellowing which comprises an aromatic polycarbonate blended with a heat stabilizing amount of a 2-keto-1,3-dioxolane containing compound having a boiling point greater than about 250° C.

2. The composition as set forth in claim 1 wherein the amount of dioxolane compound ranges from 100 to 10,000 parts per million.

3. The composition as set forth in claim 1 wherein the amount of dioxolane compound ranges from 500 to 5,000 parts per million.

4. The composition as set forth in claim 1 wherein the dioxolane compound is selected from the group consisting of
   (a) organic compounds having a single dioxolane group,
   (b) organic compounds having two dioxolane groups, or
   (c) organic compounds having three or more dioxolane groups.

5. The composition as set forth in claim 1 wherein the dioxolane compound is 4-p-toluyloxymethyl-2-keto-1,3-dioxolane.

6. The composition as set forth in claim 1 wherein the dioxolane compound is 2,2-bis[p-(2-keto-1,3-dioxolanyl-4-methyoxy) phenyl] propane.

* * * * *